May 22, 1934.  W. O. SIMPSON  1,959,741

NUT LOCK

Filed Aug. 17, 1932

Inventor
William Olindo Simpson
By B. Singer, Atty.

Patented May 22, 1934

1,959,741

UNITED STATES PATENT OFFICE 1,959,741

NUT LOCK

William Olindo Simpson, Mexico City, Mexico

Application August 17, 1932, Serial No. 629,196
In Mexico May 4, 1932

2 Claims. (Cl. 151—33)

The invention refers to nut locks, and more especially to a lock for the nuts securing the fish plates to the rail joints, and has for its object to prevent the slackening or loosening of these nuts due to the traffic on the rails.

According to the invention, the locking of the nuts is obtained by providing on the face of the nut adjoining the fish plate, a round or cylindrical part which on tightening the nut on the bolt, is pressed with its outer surface against a bearing surface provided on the fish plate, and is frictionally held thereto along the whole or part of its periphery.

Several embodiments of the invention are shown in the accompanying drawing, in which.

Figure 1:
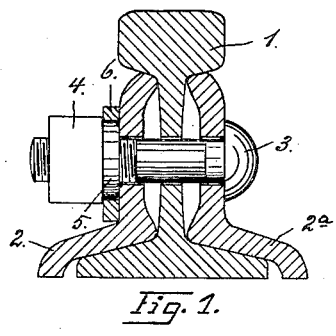
Figure 1 is a sectional view of a rail and two fish plates, with the bolt nut held by its cylindrical part in a separate washer.
Figure 2:
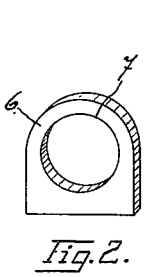
Figure 2 is a perspective front view of the washer.

In the drawing, 1 is the rail, and 2 and 2ª the fish plates holding the rail ends together and attached by the bolts 3. The fish plates form the base elements of the nut locks and may be of any of the known types.

The novel feature of the invention consists in combining a nut 4 having a cylindrical part 5 on its side abutting against the fish plate, with a surface provided on said fish plate, against which the periphery of said cylindrical part is pressed during the tightening of the nut, said surface bearing against the whole or part of the periphery of said cylindrical part 5 and preventing its loosening. The nut is therefore securely locked by the frictional adherence between the cylindrical part of the nut and the bearing surface against which it is pressed when the nut is tightened.

Figure 1 shows as a base member a fish plate 2 of the common type. For adapting the nut lock according to the present invention, to this kind of plates, I use a washer 6 preferably rounded on its upperside and having a straight lower edge resting against the angle formed by the lower flange of the fish plate. The washer 6, of a thickness equal to the width of the cylindrical part 5 of nut 4, has a perforation 7 substantially equal in diameter to said cylindrical part, so that as the nut is tightened on the bolt 3, its cylindrical part 5 is forcibly pressed into said perforation 7 and securely locked against loosening. The front edge of the cylindrical part 5 may be slightly beveled so as to facilitate its insertion into the washer.

Figure 3:
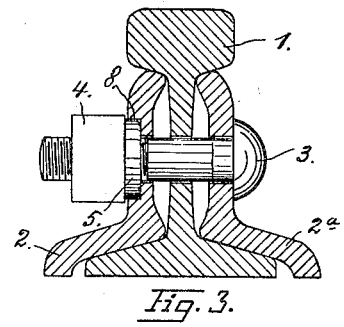
Figure 3 is another sectional view of the rail and fish plates, with the cylindrical part of the nut entering a cavity or recess in the fish plate.
Figure 4:
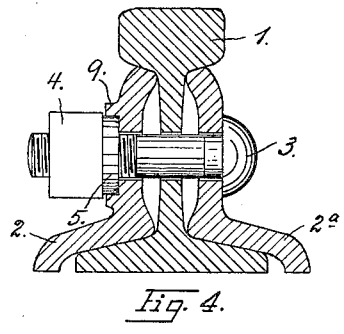
Figure 4 is a view similar to Figure 3, wherein the cavity for receiving the cylindrical part of the nut is located in a projecting portion of the fish plate.
Figure 5:
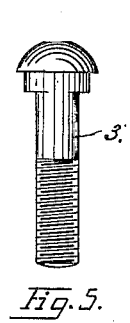
Figure 5 shows the fish bolt.
Figures 6, 7, 8, 9:
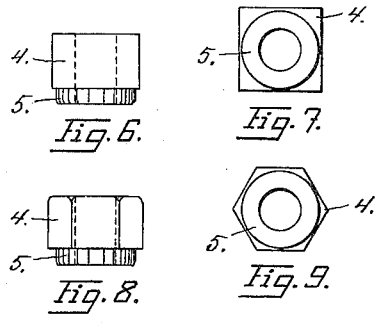
Figures 6 and 7 are respectively a side view and a plan view of a squareheaded nut with cylindrical part.
Figures 8 and 9 are similar views of a nut with hexagonal head.

In Figure 3, the cylindrical part 5 enters a round cavity or recess 8 provided in the fish plate 2 and extending through part of its thickness. The diameter of this recess is also substantially equal to that of the cylindrical part 5, so that the latter will enter the recess forcibly and be locked therein. The same cavity or recess 8 is also shown in Figure 4, but provided in a ring-shaped projection 9 of the fish plate 2, which prevents weakening of said plate along the recessed portion. The projecting ring 9 may form an integral part with the fish plate, or be welded to the same or affixed by any other means.

Figure 10:
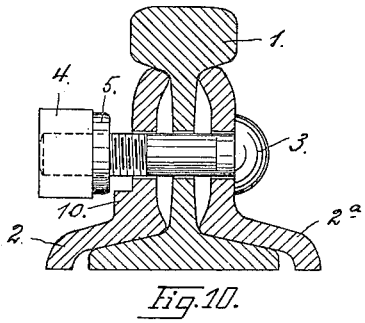
Figure 10 is a sectional view of a rail and fish plates, with the bolt inserted and the nut partially screwed on, showing a shoulder on one fish plate for locking the nut.
Figure 11:
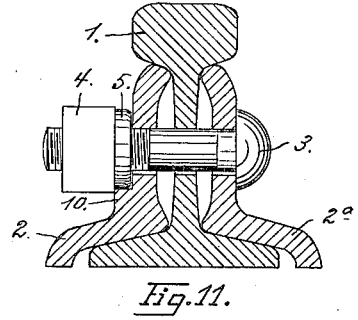
Figure 11 is the same view with the nut tightened and locked.

Figures 10 and 11 show a nut lock wherein the cylindrical part 5 of the nut 4 engages the bearing surface of the fish plate with only part of its periphery. For this means, a shoulder 10 extends horizontally across the face of the fish plate 2, the height of this shoulder being such that its upper edge, as shown in Figure 10, is a little higher than the lower face of the cylindrical part 5 of the nut, and approximately at the same level with the slightly beveled front edge of said cylindrical part. When therefore the nut 4 is tightened on the bolt 3, the beveled edge of the cylindrical part 5 engages the shoulder 10, whereby the bolt is raised so as to press tightly against the upper part of the bolt hole in the fish plate 2, and the cylindrical part 5, with its straight side back of the bevel, presses against the shoulder 10 and is locked thereby.

Figure 12:
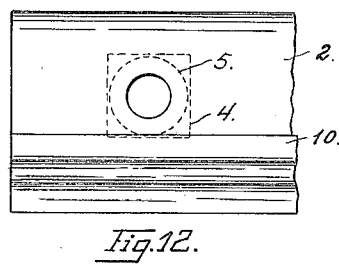
Figure 12 is a front view of a section of a fish plate with a straight shoulder for locking the nut.
Figure 13:
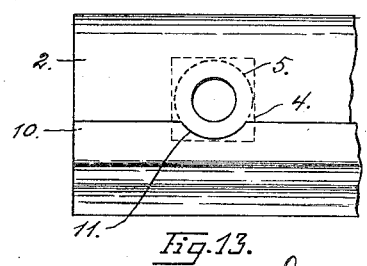
Figure 13 is another front view of a section of fish plate with a shoulder having a curved recess for receiving and locking the cylindrical part of the nut.

The shoulder 10 may either be straight, as shown in Figure 12, and then only engage a small part of the periphery of the cylindrical part 5, or it may have rounded recesses 11 (Figure 13) so as to embrace a larger arc of said cylindrical part, thereby increasing the adhesion and frictional resistance between both parts.

It will be noted that the projecting cylindrical part 5 of the nut has a wall of such thickness as to be non-distortable when the nut is applied.

While the invention has been shown in the drawing as particularly applied to fish plates, I wish it to be understood that the same nut lock may also be used with any other equipment or appliances.

What I claim is:

1. A nut lock comprising in combination a bolt, a member through which the bolt extends and having a stationary bearing surface, and a nut threaded on the bolt, having its inner surface opposed to said member, said nut having a non-distortable cylindrical portion projecting from its inner surface and the periphery of which bears frictionally against said bearing surface of said member, the axes of the cylindrical part of the nut and of the stationary bearing surface being both parallel to the axis of the nut, the said member being a fish plate having the stationary bearing surface frictionally engaged by the periphery of the cylindrical portion of the nut.

2. A railroad track nut lock comprising a fish plate having an opening and also having in its outer side a recess concentric with said opening, a bolt extending through said opening and a nut threaded on the bolt and having its inner surface opposed to the fish plate, said nut having a non-distortable cylindrical portion projecting from its inner face and the periphery of which bears frictionally against the inner peripheral surface presented by the wall of said recess, the axes of the cylindrical part of the nut and of the stationary bearing surface constituted by the peripheral inner face of the recess being both parallel to the axis of the nut.

WILLIAM OLINDO SIMPSON.